Patented July 26, 1938

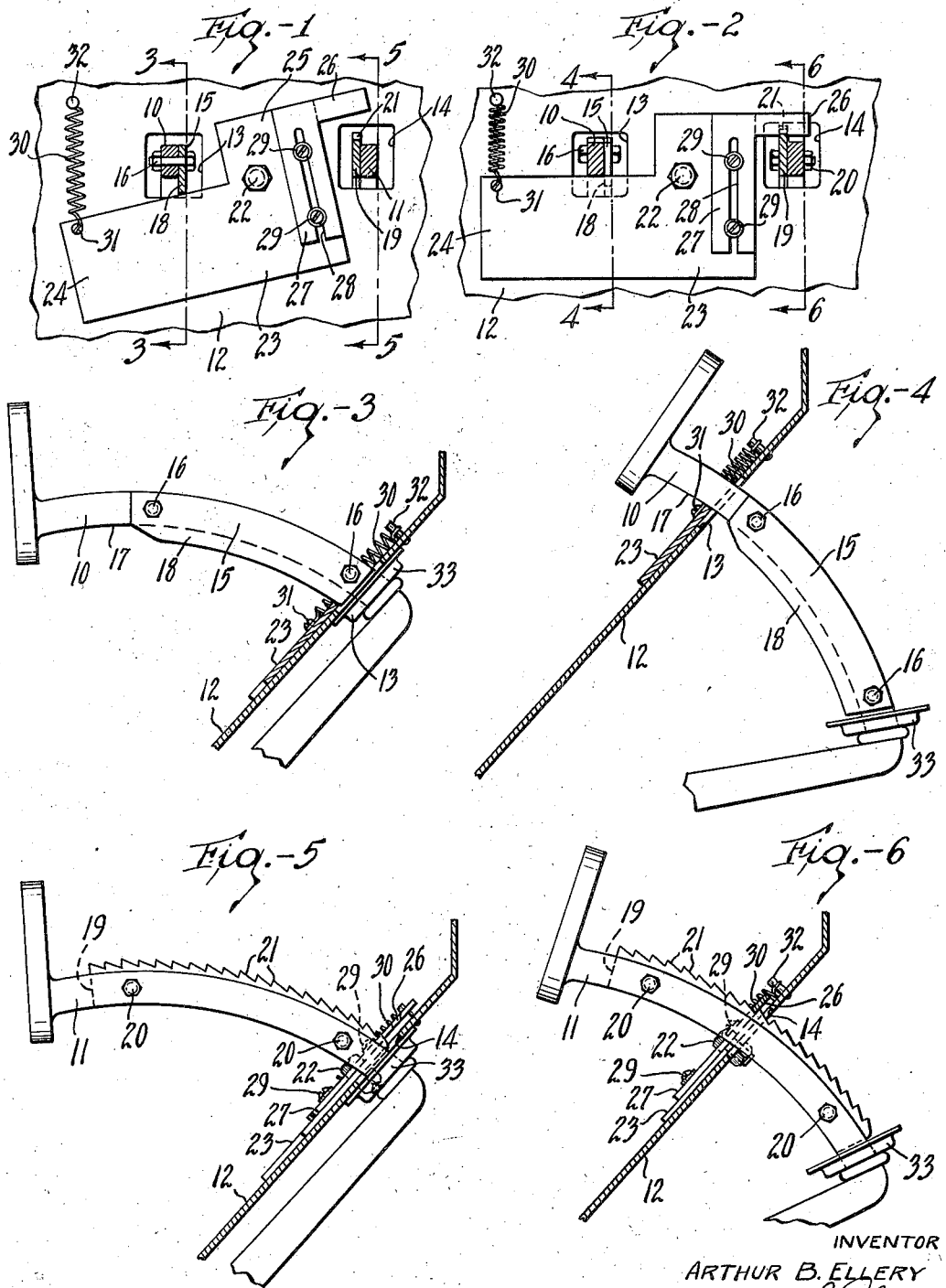

2,125,104

UNITED STATES PATENT OFFICE 2,125,104

VEHICLE BRAKE CONTROL MECHANISM

Arthur B. Ellery, Akron, Ohio

Application March 20, 1937, Serial No. 132,062
Renewed April 22, 1938

8 Claims. (Cl. 192—13)

This invention relates to new and useful improvements in control mechanism for vehicle brakes. More particularly it relates to improved mechanism for automatically holding the foot brake in braking position when the brake and clutch pedals are depressed a predetermined distance.

It is an object of the invention to provide novel means for automatically holding the foot brake applied whereby the foot can be removed from the brake pedal without releasing the brakes, said means being operated by the clutch pedal to release the brakes as the clutch pedal returns to its normal position. This arrangement will prevent the vehicle from rolling down a grade as the gears are being shifted and will also prevent stalling of the vehicle engine.

Another object is to arrange the parts of the mechanism whereby manipulation of the pedals will operate the mechanism without further action on the part of the vehicle driver.

A further object is to provide mechanism that can be easily attached to existing types of motor vehicles with but slight change thereto.

Other objects and advantages will be come apparent from the following description taken in conjunction with the accompanying drawing.

In the drawing:

Fig. 1 is a partial plan view in the direction of the inclined portion of a vehicle floorboard with the pedals shown in section, and with the brake holding mechanism in inoperative position;

Fig. 2 is a similar view with the brake holding mechanism in operative position;

Fig. 3 is a section taken substantially on line 3—3 of Fig. 1;

Fig. 4 is a section taken substantially on line 4—4 of Fig. 2;

Fig. 5 is a section taken substantially on line 5—5 of Fig. 1; and

Fig. 6 is a section taken substantially on line 6—6 of Fig. 2.

Referring to the drawing, the numerals 10 and 11 indicate respectively the conventional clutch and brake pedals of a vehicle and which are adapted to be operated in the usual manner by the driver, being automatically returned to their normal positions when not depressed and when the brake pedal is not locked by my mechanism, as will be understood. The numeral 12 designates the inclined portion of the vehicle floorboard having therein spaced openings 13 and 14 through which the pedals extend.

The clutch pedal 10 has a cam plate 15 secured thereto as at 16, which plate terminates short of the foot-engaged portion of the pedal, providing a space 17 between the latter portion of the pedal and the upper end of the cam plate, to be later referred to. The portion 18 of this cam plate which extends below the pedal as viewed in Figs. 1 and 3 will also be later referred to. Brake pedal 11 has a rack 19 secured thereto as at 20, the teeth 21 of the rack extending above this pedal as viewed in Figs. 2 and 5.

Pivotally mounted as at 22, at a point intermediate the pedals is a lever 23, the end 24 of which is adapted to be engaged by the cam plate 15 in a manner to be described. Preferably lever 23 is mounted on the upper surface of the floorboard so as to utilize the latter as a support for the lever. The end 25 of the lever has a dog or pawl 26 adjustably secured thereto for engagement with the rack teeth. As shown, pawl 26 forms one leg of an L-shaped member 27 which is slotted as at 28 to receive screws 29 by means of which the pawl may be held in selected positions, as will be understood. Usually, any adjustment of pawl 26 is made to suit the vehicle on which the device is installed and need not be changed after installation. However, by means of the adjustment the device can be made to fit other vehicles which vary somewhat with respect to the location of the pedals, etc.

The end 24 of the lever has one end of a coil spring 30 secured thereto as at 31, the opposite end of said spring being secured as at 32 to the floorboard 12. Spring 30 is a tension spring and constantly urges the pawl 26 into engagement with the rack teeth so as to lock the brake pedal. Each pedal has a rubber cushioning member 33 carried thereon to cushion the shock of the rebound of the lower end of the pedals against the floorboard.

While the vehicle is being operated normally with both pedals free of any force tending to depress them, lever 23 is in the position shown in Fig. 1, with the pawl out of engagement with the rack. This position is maintained by reason of the depending portion 18 of cam plate 15 being in engagement with the lever, as clearly shown in Figs. 1 and 3. As soon as the clutch pedal is depressed to the point shown in Fig. 4, i. e. when the cam plate no longer engages the lever, spring 30 automatically urges pawl 26 into engagement with rack teeth 21 whereby the brake pedal will be held at any point to which it has been depressed, thereby allowing the vehicle driver to remove his foot from the brake. When the clutch pedal is released the cam plate 15 will immediately engage the lever and force the pawl out of locking position to release the brakes.

My mechanism is very simple and the parts may be readily attached to any vehicle. Also it is fool-proof since the operator cannot lock the brakes without pressing both pedals. In other words, the application of the brake pedal alone can in no way cause the brake pedal to lock. Similarly, the application of the clutch pedal alone, even if depressed beyond the end of the cam plate so as to cause movement of the pawl into engagement with the rack, cannot lock the brakes when they have not been applied.

While I have shown and described the preferred embodiment of my invention, it will be understood that I am not to be limited thereto as modifications and changes may be resorted to without departing from the spirit of the invention or from the scope of the subjoined claims.

What is claimed is:

1. Mechanism for controlling the brakes of a vehicle having conventional clutch and brake pedals comprising, a lever pivoted intermediate its ends and between said pedals, means on one end of said lever engageable with said brake pedal to lock the latter in selected positions, means applying a force to the other end of said lever to constantly urge said first named means into engagement with said brake pedal to lock the latter, and means carried by said clutch pedal to prevent application of said force until said clutch pedal has been depressed a predetermined amount.

2. Mechanism for controlling the brakes of a vehicle having conventional clutch and brake pedals comprising, a lever pivoted intermediate its ends and between said pedals, means on one end of said lever engageable with said brake pedal to lock the latter in selected positions, means applying a force to the other end of said lever to constantly urge said first named means into engagement with said brake pedal to lock the latter, and a cam plate carried by said clutch pedal and engageable with said lever to prevent application of said force until said clutch pedal has been depressed a predetermined amount.

3. Mechanism for controlling the brakes of a vehicle having conventional clutch and brake pedals comprising, a cam plate carried by the clutch pedal, a rack carried by the brake pedal, a lever pivoted intermediate said pedals and engageable by said cam plate, a pawl on one end of said lever and engageable with the teeth of said rack, and a spring connected to the other end of said lever and constantly urging said pawl into engagement with the teeth of said rack, said cam plate while in engagement with said lever acting against the force of said spring to prevent engagement of said pawl with said rack teeth.

4. In combination with the brake and clutch pedals of a motor vehicle, a lever having one end engageable with the brake pedal for holding the same in braking position and having its other end engageable with the clutch pedal for removing its first mentioned end from engagement with the brake pedal, and yielding means normally urging said lever to engagement with the brake pedal.

5. In combination with the brake and clutch pedals of a motor vehicle, a lever operatively cooperating with said pedals, means on said lever engageable with said brake pedal to lock the latter in selected positions, means applying a force to said lever to constantly urge said first named means into engagement with said brake pedal to lock the latter, and means carried by said clutch pedal and engageable with said lever to prevent application of said force while said last named means is in engagement with said lever.

6. In combination with the brake and clutch operating mechanisms of a motor vehicle including a clutch pedal, a lever operatively cooperating with said mechanisms, means on said lever engageable with said brake operating mechanism to lock the latter in selected positions, means applying a force to said lever to constantly urge said first named means into engagement with said brake operating mechanism to lock the latter, and a cam plate carried by said clutch pedal and engageable with said lever to prevent application of said force at all times that said cam plate is in engagement with said lever.

7. In combination with the brake and clutch operating mechanism of a motor vehicle, including a clutch pedal, a cam plate carried by the clutch pedal, a rack carried by the brake operating mechanism, a lever operatively cooperating with said mechanism and engageable by said cam plate, a pawl on said lever and engageable with the teeth of said rack, and a spring connected to said lever and constantly urging said pawl into engagement with the teeth of said rack, said cam plate at all times that it is in engagement with said lever acting against the force of said spring to prevent engagement of said pawl with said rack teeth.

8. In combination with the brake and clutch pedals of a motor vehicle, a lever having one end engageable with the brake pedal for holding the same in braking position and having its other end engageable with the clutch pedal for removing its first mentioned end from engagement with the brake pedal, yielding means normally urging said lever to engagement with the brake pedal, and means preventing engagement of said lever with said brake pedal until said clutch pedal has been operated a predetermined amount.

ARTHUR B. ELLERY.